Dec. 14, 1965   H. W. WILLIAMS   3,223,269
SNAP-ON CLOSURE
Filed Dec. 21, 1964

INVENTOR
HAROLD W. WILLIAMS
BY
Harvey W. Elkute
ATTORNEY

United States Patent Office 3,223,269
Patented Dec. 14, 1965

3,223,269
SNAP-ON CLOSURE
Harold W. Williams, Pawling, N.Y., assignor to Owens-Illinois Glass Company, a corporation of Ohio
Filed Dec. 21, 1964, Ser. No. 420,026
7 Claims. (Cl. 215—43)

This application is a continuation-in-part of an application filed in my name on November 20, 1962, which has the serial No. 238,981, and which is now abandoned.

My invention relates to closures for containers such as small bottles made of glass or rigid plastic material, and more particularly, it is an improvement in a screw cap type of closure.

The advantages of screw cap closures in providing security of attachment to the container and ease of manipulation in the hands of the user are of course well known. However, those screw caps in common use have also some serious disadvantages. When made of rigid plastic or metal, a liner of more yielding material must be provided, thus adding considerably to the cost and not always providing a satisfactory seal. More recently there have been proposals to mold such caps of a pliable plastic material such as polyethylene and avoid the use of a liner by some flexible section engaging the top edge of the bottle. These have not been entirely satisfactory due to variations in the top finish of the bottles as commercially produced in large quantities.

Another trouble with screw caps arises in the filling and closing of bottles by automatic machines. Such machines employ a relatively complicated torque release device and a certain number of "leakers" will inevitably result due to imperfect operation of the device which applies the cap, or to variations in the finish of the bottle.

The object of my invention is to overcome the above mentioned troubles or disadvantages in a screw cap which can be economically molded and assembled by relatively simple machinery, and in the same structure providing a seal which shall be effective regardless of small variations in the length of or smoothness of the finish at the top of the bottle. The novel cap structure consists of a single unitary molded piece of pliable plastic material such as polyethylene, except when a more colorful top appearance is desired, in which case a disc of more rigid plastic material may be easily snapped into a modified form of the cap.

The use of pliable plastic material is so common in the closure art that no purpose would be served here by a fuller discussion of their technical nature, or of the possible variations in their composition. However, one property of such material is utilized in a way which is novel in this art, to permit the caps to be initially assembled by a straight endwise or downward pressure on the top of the cap, after which the cap may be removed and replaced easily by the same twisting action as in all screw caps. This is the property of flexibility and reasonable elasticity in relatively thin walled sections, along with its ability to return to and sustain its original form after a certain amount of deforming or stretching under force. According to my invention, the outer wall of the cap is made sufficiently thin that the thread on its inner surface will snap over the thread on the bottle merely by pushing the cap into place by force in an axial direction. For any particular set of conditions the optimum wall thickness may be determined by trial. I have found, for example, that with a cap having an over-all diameter of about three quarters of an inch, the wall thickness may be about three sixty-fourths of an inch. There is thus provided a cap whose wall thickness permits it to have the necessary pliability while at the same time a sufficient form retaining character that it can be used and handled as a screw cap.

In the accompanying drawings I have shown for purposes of illustration two embodiments which the invention may assume in practice.

Figure 1:
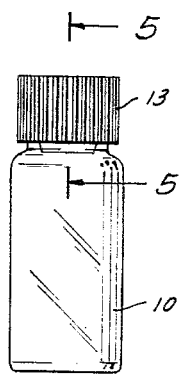
FIGURE 1 is an elevation of a container with the snap-on closure of the present invention in position.
Figure 2:
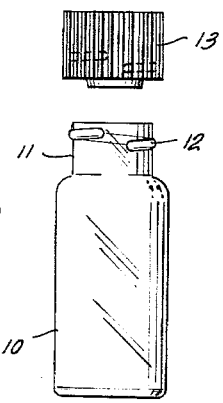
FIGURE 2 is an elevation of the container with the snap-on closure removed.

A typical container for which my invention is useful may be a small bottle 10 of glass or plastic material as shown in FIGURE 1. The bottle may have a cylindrical neck 11 (FIGURE 2) with an external thread 12. Preferably, but not necessarily, this is a single thread extending all or most of the way around the circumference of the neck of the bottle and has a smoothly rounded cross-sectional contour as will be seen from the cross-sectional view of FIGURE 5.

Figure 3:
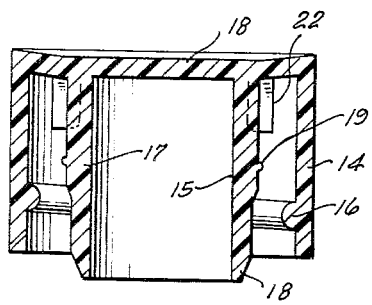
FIGURE 3 is a cross-sectional view in elevation of one embodiment of the closure of the present invention.
Figure 4:
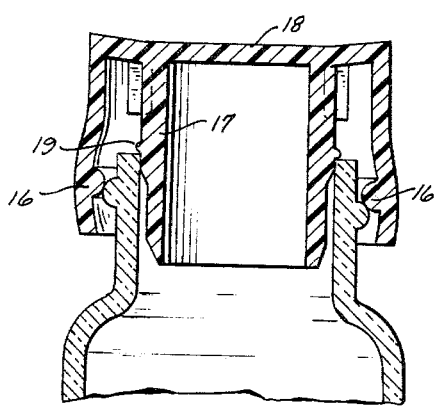
FIGURE 4 is a cross-sectional view in elevation of the snap-on closure as it would appear when being forced into position on a container.
Figure 5:
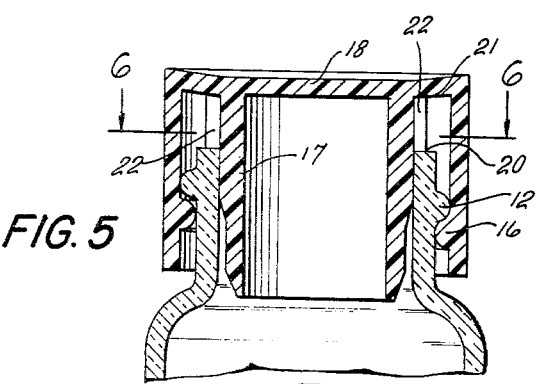
FIGURE 5 is a cross-sectional elevation of the snap-on closure of the present invention in place.

Although the closure member 13 is of the screw-on screw-off type, it is distinctly different from the ordinary screw-type closure in a number of important respects. The novel closure of the present invention is unique in that it can be put in place and the bottle closed by a direct snap-on action by merely pressing the closure straight down over the mouth of the bottle. No turning of the screw cap is necessary to obtain a tight seal. The closure has an outer wall 14 (FIGURE 3) sufficiently strong to retain the cap securely on the bottle when the threads are engaged as shown in FIGURE 5, yet it is sufficiently thin that it will stretch outwardly as illustrated in FIGURE 4 to allow the internal threads 16 to pass over the thread 12 on the neck of the bottle when vertical force is applied to the top of the cap. The internal thread on the closure is generally rounded as shown in the drawings to facilitate passage of the threads of the cap over the thread on the neck of the bottle. This internal thread preferably has only one turn or slightly less than one turn.

A most important element of the present invention resides in the fact that the pitch of the thread on the interior of the cap is different than the pitch of the thread on the neck of the bottle. For instance, if the thread 12 on the neck of the bottle has a pitch of twelve threads to the inch, the thread on the interior of the cap should have a pitch of about fourteen threads per inch. In such a case, the thread on the cap is in maximum contact with the thread on the neck of the bottle at only one point on its circumference as it is being forced over the latter on assembly and is not therefore in contact over the entire length of the thread as would be the case if the threads were of the same pitch.

This makes it possible for the thread on the cap to slide over the thread on the neck of the bottle smoothly with a constant resistance to the applied pressure and without undue distortion of the cap. This construction also results in a holding action by the contacting threads as shown in FIGURE 5 over a substantial axial distance so that the cap is held securely in place and the plug type sealing member 17 remains effective even though the cap may be partially unscrewed. As will be seen, the cap can be screwed off the neck of the bottle in the usual manner and the cap can be replaced by either direct axial pressure or by a turning screw-on action. Although I prefer that the cap have a pitch of about two more threads per inch than the threads on the bottle to which it is fitted, this relationship may vary somewhat so that the cap may have a pitch of from one to about four more threads per inch than the screw thread on the bottle.

In my improved closure, the seal is accomplished by a hollow cylindrical member 17 extending from the top wall 18. It may have a slight taper at the bottom to assist in leading it into the bottle. The lower section of the cylinder may also have a slightly smaller diameter than the upper section as shown somewhat exaggeratedly in the drawing to further aid in inserting this sealing member in the neck of the bottle. The cylindrical plug extends downwardly from the top wall to at least level with the screw thread 16 on the side wall of the outer skirt 14. This makes it possible for the plug to act as a guide and also as a support for the cap as it is being pushed into the neck of a container. Were it not for this support, there would be a tendency for the cap to tip slightly as the thread on the cap passes over the thread on the neck of the bottle. The relatively long length of the cylindrical member also makes it easier to inspect the finished item for defective moldings.

In the normal case, as seen in FIGURE 5, the stopper engages the inner surface of the bottle neck with a snug fit. Nevertheless, in order to give added assurance against leakage, the stopper may be formed with a circular bead 19 shown in FIGURES 3 and 4 which will be yieldingly pressed into engagement with and conform to any irregularities in shape of the inner surface of the bottle. In this action the stopper wall may yield slightly inwardly in the region of the bead but to an extent scarcely noticeable.

In view of the fact that there are substantial variations in the surface of the neck of glass bottles even though manufactured under the highest standards of workmanship, it is desirable that the cylindrical walls of the plug closure 17 have the ability to give a little to compensate for slight ridges and other irregularities in the inner neck of the bottle. This important function is made possible by the resilient nature of the plastic material of which the closure is made and also by a second important structural feature of the closure of the present invention.

As will be seen from FIGURE 5, the top of the bottle 20 is an appreciable distance from the inner top wall 21 of the cap when the cap is in place. The distance between 20 and 21 when the closure is in place as shown in the drawing, makes it possible for parts of the cylindrical side wall plug member 17 to be displaced laterally at the top of the neck of the bottle when it is inserted and thus compensate for irregularities in the surface of the glass. It will be seen that if the cap was pressed completely down on the top of the neck of the bottle, as is usually the case with screw-on type closures, the section of the cylindrical plug close to the top wall of the cap could not yield to compensate for irregularities in the neck of the bottle. Similarly, this construction allows the outer cylindrical wall 14 of the cap to deform more readily as the closure is snapped in place which makes it easier to force the threads over the bottle and reduces chance of breakage.

Figure 6:
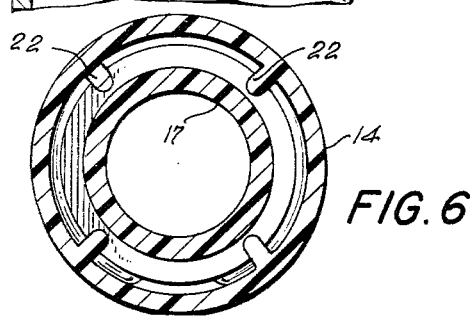
FIGURE 6 is a cross-sectional plan view of the snap-on closure taken along the line 6—6 of FIGURE 5.

To prevent the plug from being forced too far into the neck of the bottle, an abutment 22 is provided in the upper part of the annular space between the cylindrical plug and the outer skirt member. As shown in the plan view of FIGURE 6, a preferred embodiment consists of abutments located between the inner wall of the outermost cylindrical portion of the closure and the outer wall of the cylindrical plug member and are so constructed as to allow the cylindrical plug closure member to move away from the outer cylindrical wall in response to undulations in the neck of the bottle. To permit flexing of the plug member over its entire length, the abutments should not connect the inner wall of the skirt with the outer wall of the plug. In a preferred form of the invention, the abutments depend from the inner wall of the skirt and top wall of the closure. They could, however, depend from the outermost wall of the plug with, however, some slight loss of flexibility in the upper section of the plug member.

Figure 7:
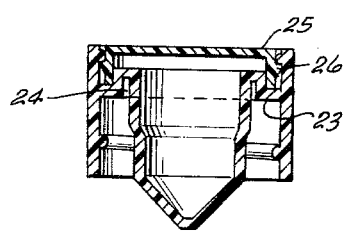
FIGURE 7 is a cross-sectional elevation of a modification of the snap-on closure of the present invention.

An alternative structure for accomplishing the same above purposes is shown in FIGURE 7 in which the abutment consists of a circular section 23 molded inwardly from the outer cylindrical wall of the cap, there being provided, however, an annular space 24 which permits the inner cylindrical plug member greater opportunity for distortion when forced into the neck of a bottle than would be the case if the space were not provided.

The structure illustrated in FIGURE 7 also provides for an insert member 25 which can be made to snap into place and is held firmly by a shoulder 26 molded on the insert. This snap-in insert may be of a different color or material and provides means of carrying designs and information of various types. These inserts can be produced with relatively inexpensive molds. Although they can be used to good advantage with closures of the present invention, these particular snap-in top members form the subject of my United States Patent 2,549,404 which issued on April 17, 1951.

The new closure of the present invention can be made from a variety of resilient materials which are commercially available, among them being the various types of polyethylene, polypropylene, rubber, suitably plasticized resilient vinyl polymers and copolymers, and other materials.

From the above detailed description of two specific embodiments of my invention, it will be recognized that there is made available an improved closure which meets all the above described objectives in a unique way. Because it can be assembled merely by lining up the caps with the bottles and applying a straight downward action or force to the caps, there is a substantial saving as compared to the prior practice of assembling by a threading action. Although, of course, polyethylene stoppers per se are not new, the stopper portion of the present closure provides an effective seal without relying on anything engaging the top edge finish of the bottle. Thus the method of initial assembly of a screw cap which has been described is practical even with slight variations in the dimensions of that portion of the neck of the bottle above the thread. The hollow stopper of FIGURES 3, 4, and 5 is especially advantageous where the contents of the bottle may be volatile and build up pressure. Such pressure will act outwardly against the stopper wall to increase the holding and sealing effect.

What is claimed is:

1. A screw cap closure for bottles having a cylindrical neck with a screw thread, said screw cap being characterized by having:

(a) a top wall, (b) an inner tubular plug member depending from the inner face of said top wall serving as means to close the mouth of a bottle having a cylindrical neck, said tubular member being relatively thin walled and resilient to conform to irregularities in the neck of said bottle, (c) an outer tubular skirt member concentric with said inner tubular plug member having a screw thread on its inner wall and being relatively thin and resilient so as to deform sufficiently to allow the screw thread to pass over screw threads on the neck of a bottle when downward pressure is applied to said screw cap thus permitting the inner tubular member to enter the mouth of a bottle and seal the same, and (d) an abutment in the upper part of the annular space between the inner tubular plug member and the inner wall of the outer tubular skirt adapted to lodge against the top of a bottle into which the plug member is inserted to prevent entry of the inner plug member over its full length into the neck of a bottle into which the plug is pushed, said abutment being unattached to at least one of the walls of the cylindrical plug and outer skirt so as not to hinder lateral movement of said wall as it is deformed by irregularities in the surface over which it passes when the closure is placed in position.

2. A screw cap closure in accordance with claim 1 in which the inner tubular plug member extends downwardly from the inner face of the top wall beyond the screw thread on the side wall.

3. A screw cap closure in accordance with claim 1 in which the inner tubular plug member has a slight taper at its lower end and the lower section of said cylindrical member has a slightly smaller diameter than the upper section thereof.

4. In combination, a container having a cylindrical neck with a screw thread thereon and a screw cap closure being characterized by having:
 (a) a top wall,
 (b) an inner tubular plug member depending from the inner face of said top wall serving as means to close the mouth of said bottle, said tubular member being relatively thin walled and resilient to conform to irregularities in the neck of said bottle,
 (c) an outer tubular skirt member concentric with said inner tubular plug member having a screw thread on its inner wall and being relatively thin and resilient, said screw thread having a pitch of one to four more threads per inch than the pitch of the screw thread on the neck of said container.

5. In combination, a container having a cylindrical neck with a screw thread thereon and screw cap closure being characterized by having:
 (a) a top wall,
 (b) an inner tubular plug member depending from the inner face of said top wall serving as means to close the mouth of said bottle, said tubular member being relatviely thin walled and resilient to conform to irregularities in the neck of said bottle,
 (c) an outer tubular skirt member concentric with said inner tubular plug member having a screw thread on its inner wall and being relatively thin and resilient, said screw thread having a pitch of two more threads per inch than the pitch of the screw thread on the neck of said container, said screw thread on the skirt member engaging the screw thread on the container at one point on its circumference and thereby holding the screw cap closure in place.

6. In combination, a container having a cylindrical neck with a screw thread thereon and a screw cap closure being characterized by having:
 (a) a top wall,
 (b) an inner tubular plug member depending from the inner face of said top wall serving as means to close the mouth of said bottle, said tubular member being relatively thin walled and resilient to conform to irregularities in the neck of said bottle,
 (c) an outer tubular skirt member concentric with said inner tubular plug member having a screw thread on its inner wall and being relatviely thin and resilient, said screw thread having a pitch of one to four more threads per inch than the pitch of the screw thread on the neck of said container, said screw on the skirt member engaging the screw thread on the container at one point on its circumference,
 (d) an abutment in the upper part of the annular space between the inner tubular plug member and the inner wall of the outer tubular skirt engaging the top of the neck of the bottle and holding the top of the bottle a short distance from the inner top wall of the screw cap.

7. In combination, a container having a cylindrical neck with a screw thread thereon and a screw cap closure having a thin walled inner tubular plug member of resilient character adapted to fit into and seal the open neck of a bottle, a thin walled resilient outer tubular skirt member concentric with said inner tubular plug member having a screw thread on its inner wall the pitch of which is one to four more threads per inch than the pitch of the screw thread on the neck of said container, an annular abutment depending inwardly from said outer tubular skirt member to form a ledge to engage the top surface of the neck of a bottle, said annular abutment depending upwardly a short distance and then inwardly to join the inner tubular plug member and thus form an annular space between the abutment and the plug member.

References Cited by the Examiner

UNITED STATES PATENTS

| 3,080,991 | 3/1963 | Fox | 215—41 |
| 3,142,402 | 7/1964 | Fox | 215—43 |

FOREIGN PATENTS

Ad. 67,661  3/1958  France.

JOSEPH R. LECLAIR, *Primary Examiner*

FRANKLIN T. GARRETT, *Examiner.*